United States Patent [19]

Crawford

[11] Patent Number: 4,895,759

[45] Date of Patent: Jan. 23, 1990

[54] SATURATING GRADE PAPER

[75] Inventor: Roger A. Crawford, Wadsworth, Ohio

[73] Assignee: PPG Industries, Inc., Pittsburgh, Pa.

[21] Appl. No.: 315,981

[22] Filed: Mar. 2, 1989

Related U.S. Application Data

[63] Continuation-in-part of Ser. No. 169,653, Mar. 18, 1988, abandoned.

[51] Int. Cl.$^4$ ............................................. B32B 29/00
[52] U.S. Cl. .................................. 428/331; 162/164.4; 162/181.4; 162/181.7; 162/DIG. 5; 428/328; 428/528; 428/530; 428/537.5
[58] Field of Search ................. 162/181.4, 181.7, 128; 428/328, 831, 530, 537.5, 702

[56] References Cited

U.S. PATENT DOCUMENTS

| | | | |
|---|---|---|---|
| 3,365,358 | 1/1968 | Hutchins | 162/155 |
| 3,525,664 | 8/1970 | Hale et al. | 161/162 |
| 3,737,371 | 6/1973 | Seward et al. | 162/181 B |
| 3,756,901 | 9/1973 | Veneziale | 161/6 |
| 3,794,552 | 2/1974 | Schmidt | 161/232 |
| 3,814,647 | 6/1974 | Scher et al. | 156/219 |
| 3,840,428 | 10/1974 | Ring et al. | 162/146 |
| 3,968,291 | 7/1976 | Chevallier | 428/203 |
| 4,060,450 | 4/1975 | Palazzolo et al. | 162/141 |
| 4,097,649 | 6/1978 | Neumann | 428/327 |
| 4,117,191 | 9/1978 | Kurrie | 428/330 |
| 4,255,480 | 3/1981 | Scher et al. | 428/208 |
| 4,263,081 | 4/1981 | Scher et al. | 156/279 |
| 4,305,987 | 12/1981 | Scher et al. | 428/148 |
| 4,322,468 | 3/1982 | Raghava | 428/204 |
| 4,327,141 | 4/1982 | Scher et al. | 428/148 |
| 4,473,613 | 9/1984 | Jaisle et al. | 428/220 |
| 4,505,974 | 3/1985 | Housler | 428/329 |

FOREIGN PATENT DOCUMENTS

| | | |
|---|---|---|
| 872195 | 6/1971 | Canada . |
| 1014430 | 7/1977 | Canada . |
| 1167574 | 10/1969 | United Kingdom . |
| 2085497 | 4/1982 | United Kingdom . |

Primary Examiner—George F. Lesmes
Assistant Examiner—Christopher Brown
Attorney, Agent, or Firm—Irwin M. Stein

[57] ABSTRACT

Described is a titanium dioxide-containing resin saturable paper sheet in which from about 5 to about 40 weight percent of the titanium dioxide filler is replaced with amorphous precipitated silica having an essentially neutral to slightly alkaline, e.g., 6.5 to 8.5, pH and a medium agglomerate particle size of less than 30 micrometers, e.g., 3 to 10 micrometers. The BET surface area of the silica may vary from about 25 to about 200 m$^2$/g, e.g., 50 to 100 m$^2$/g. Also described are decorative laminates in which the core of the laminate contains at least one of such saturable paper sheets.

22 Claims, No Drawings

SATURATING GRADE PAPER

CROSS REFERENCE TO RELATED APPLICATIONS

This application is a continuation-in-part of my application Ser. No. 07/169,653, filed Mar. 18, 1988, now abandoned.

DESCRIPTION OF THE INVENTION

The present invention relates to decorative laminates, e.g., high pressure decorative laminates. More particularly, the present invention relates to resin saturable paper, i.e., saturating grade paper sheets that, when impregnated with a synthetic resin, are used as core stock for decorative laminates. Still more particularly, the present invention relates to the use of a combination of titanium dioxide and a particular silica filler in such resin saturable paper sheets.

Decorative laminates have been in commercial production for many years. Commonly, this class of laminate has been produced by consolidating, under heat and pressure, an assembly of (1) a plurality of so-called core of body sheets of fibrous cellulosic material, usually kraft paper, that have been impregnated with a synthetic resinous composition, (2) an impregnated decorative color or print sheet placed over the plurality of core sheets, and (3) an impregnated surface or overlay sheet, which serves to protect the decorative print or color sheet. Such decorative laminates have been accorded wide acceptance in a multitude of uses such as wall constuction, table and desk tops, countertops, furniture and the like.

Although the core sheet is less expensive than the print of overlay sheet, the core sheet represents a significant cost factor because of the number of core sheets used in the decorative laminate. Typically from three to nine core sheets of 30 to 130 pound/per ream (3000 ft$^2$) paper are used in the preparation of decorative laminates. The principal inorganic oxide filler used in the saturable paper core sheet is titanium dioxide. Titanium dioxide is particularly useful as a filler because of its high optical scattering power resulting from its high refractive index and uniform fine particle size. Titanium dioxide is relatively expensive compared to other fillers that are used in the paper industry, but its optical properties produces degrees of opacity and brightness in the saturable core sheet (and the resulting decorative laminate) that are unattainable with such other fillers. Reducing the amount of titanium dioxide filler in saturable paper sheet without sacrificing opacity and brightness would reduce the cost of the core sheet and would permit production of larger quantities of core sheets when titanium dioxide is in short supply.

It has now been discovered that from about 5 to about 40 weight percent of the titanium dioxide utilized as filler in saturating grade paper may be replaced with a particular amorphous precipitated silica without compromising opacity and brightness. The BET surface area of such silica may vary within a fairly broad range, but generally will fall between about 25 and about 200, more paticularly between about 40 and 120, e.g., from about 50 to about 100, square meters per gram. The pH of such silica may vary from about 6 to about 9.5, but preferably will be in the range of from about 6.5 to 8.5. The median agglomerate particle size of the silica is less than 30 micrometers, preferably between 3 and 10 micrometers. More particularly, the median agglomerate particle size may vary between about 3 and 5 or between 7 and 10, micrometers, depending on the particular grade of amorphous precipitated silica used. Other than calcium incorporated from the water used in the manufacturing process, the amorphous precipitated silica is substantially free of added, coformed or coprecipitated calcium compounds, e.g., calcium oxide or calcium salts, such as calcium silicate, calcium chloride or calcium sulfate. The amount of such calcium compounds in the amorphous precipitated silica (calculated as calcium oxide) is commonly less than 1 weight percent, e.g., less than 0.75 weight percent.

Certain grades of amorphous hydrated precipitated silica have been suggested for use as a filler in types of paper other than saturable paper sheet, e.g., to replace a portion of the titanium dioxide pigment used therein or to enhance a cheap filler such as clay. The grade of hydrated silica suggested for such use consisted essentially of about 78 percent silica and 5-7 weight percent calcium oxide. This silica is alkaline—having a pH of approximately 10 and a surface are of about 40 square meters per gram. It has not been used previously, to my knowledge, in the manufacture of saturating grade paper, nor suggested for use in such grade of paper.

DETAILED DESCRIPTION OF THE INVENTION

Amorphous precipitated silica that may be used to replace a portion of the titanium dioxide filler in saturating grade paper is an essentially neutral, finely-divided white powder. The median agglomerate particle size of the silica is less than about 30 micrometers, preferably between about 3 to 10 micrometers. In one particular embodiment, the median agglomerate particle size of the silica may be between 3 and 5 micrometers. In a second embodiment, the median agglomerate particle size of the silica may be between 7 and 10 micrometers. The BET surface area of the silica may vary between about 25 and about 200, more particularly between about 40 and about 120 square meters per gram ($m^2/g$). Preferably, the surface area will range between about 50 and 100 $m^2/g$. Still more preferably, the surface area will range from about 50 or 60 to 90 $m^2/g$, e.g., between about 50 and abou 80 $m^2/g$. The silica is hydrated, relatively pure silica, i.e., about 88-90 weight percent silica, which is substantially free of alkaline earth metal, e.g., calcium, compounds, such as oxides and salts of such metals, e.g., calcium oxide, calcium silicate, calcium chloride and calcium sulfate.

The amount of adsorbed water present in the hydrated amorphous precipitated silica will commonly range between about 3 and about 7, e.g., about 5, weight percent. The amount of absorbed water will depend partly upon the prevailing relative humidity. Absorbed water is that water which is removed from the silica by heating it at 105° C. for 24 hours at atmospheric pressure in an oven. The silica also contains bound water in amounts of between about 2 and about 6 weight percent. Bound water is that water which is removed additionally by heating the silica at calcination tempertures, e.g., 1000° C.–1200° C.

The preferred silica is an essentially neutral or slightly alkaline material. The pH of a 5 weight percent aqueous slurry of the pigment may register a pH of between about 6 and 9.5, but preferably will be in the range of between about 6.5 and 8.5. In one particular embodiment, the pH of the aqueous silica slurry may be between about 6.5 and 7.5, e.g., about 7. In a second embodiment, the pH of the aqueous silica slurry may be between about 8 and about 8.5, i.e., slightly alkaline.

The aforedescribed amorphous precipitated hydrated silica may be prepared by neutralizing an aqueous solution of an alkali metal silicate with an inorganic acid, such as carbonic acid, hydrochloric acid or sulfuric acid. The soluble alkali metal silicate may be either a commercial or technical grade of alkali metal silicate, e.g., sodium silicate, potassium silicate or lithium silicate. Sodium silicate is readily available commercially and is the least expensive of the aforedescribed silicates and hence is the alkali metal silicate of choice. The alkali metal silicate may be represented by the molecular formula, $M_2O(SiO_2)_x$, wherein M is the alkali metal and x is a number of from 1 to 5. More commonly, x is a number from 2 to 4, such as between 3.0 and 3.4, e.g., 3.2 or 3.3. Typically, sodium silicate having an $Na_2O$:$SiO_2$ ratio of from about 1:3.0–1:3.4, e.g., 1:3.2–1:3.3, is used to prepare the aqueous solution of soluble silicate. The aqueous sodium silicate reactant solution concentration can vary widely. For example, sodium silicate solutions may be used having an $Na_2O$ concentration of from about 18.75 grams per liter to about 90 grams per liter, e.g., 30 to 40 grams per liter.

Sulfuric acid is preferred for use as the acidification agent. Acidification agent, e.g., sulfuric acid, is added gradually to the aqueous sodium silicate solution to neutralize the alkali content of the solution and precipitate the silica. A sufficient amount of acidification agent is used in the neutralization so that the dried silica product will exhibit a pH in the aforedescribed range. Addition of acidification agent over a period of from about 1 to about 4 hours, e.g., 2 to 4 hours, is typical. The temperature at which acidification of the alkali metal silicate is conducted may vary between about 175° F. (79° C.) and 210° F. (99° C.), more typically between about 180° F. (82° C.) and 190° F. (88° C.) Agitation of the aqueous reaction medium with a high speed, high shear type agitator is preferred as such agitation reduces the amount of gel formed during the precipitation procedure.

The precipitated silica is recovered from the suspending aqueous reaction medium by conventional solid-liquid separating means, e.g., a filter press, drum filter, centrifuge, etc.; washed with water to remove residual alkali metal, e.g., sodium, inorganic salts; dried; and milled to the aforedescribed median agglomerate particle size. Typically, the recovered precipitated silica is washed to reduce the alkali metal salt, e.g., sodium sulfate, content of the silica to less than about 2 weight percent, e.g., less than 1.5 weight percent, e.g., 0.8–1.2 weight percent. Drying of the washed silica may be performed in any suitable drying means, e.g., a rotary or drum dryer, a spray dryer, or a compartment dryer. Depending upon the type of drying used, the dried silica if needed is milled or ground, e.g., fluid energy milled, vertical milled, hammer milled, etc., and classified, if required to obtain a median agglomerate particle size of less than 30 microns, preferably less than 10 microns. Vertical milling is preferred.

In a typical preparation of amorphous precipitated silica that may be used in the practice of the present invention, a suitable reactor is charged with a foreshot of water, which is heated with steam to the desired initial precipitation temperature, e.g., from about 182° F. (83° C.) to about 186° F. (86° C.). An aqueous solution of sodium silicate is then added to the heated water until the concentration of sodium silicate is about 40 grams per liter $Na_2O$. The agitator within the reactor is then started and concentrated sulfuric acid is added gradually to the aqueous sodium silicate solution reaction over a period of about 3 hours. Sulfuric acid addition is continued until the pH of the reaction slurry reaches about 4. The pH of the aqueous reaction slurry is monitored for a short period of time thereafter, e.g., 15 to 45 minutes. to ensure that the pH of the slurry has stabilized and does not drift upwardly, i.e., become more alkaline. Additional sulfuric acid is added to the slurry when the slurry pH increases to above 4 during the monitoring period, thereby to produce a precipitated silica that will have a final pH in the range of from about 6.5 to about 7.5. In another embodiment, monitoring of the slurry pH is eliminated. In this embodiment, the final pH of the precipitated silica will be slightly alkaline, e.g., in the range of 8 to 9.5, more usually from about 8 to 8.5.

The resulting precipitated silica is separated from the aqueous reaction slurry, e.g., by drum filter, rotary or spray dried and vertically milled to a median agglomerate particle size of less than 10 micrometers, as measured by a Coulter counter particle size analyzer.

The amount of amorphous precipitated hydrated silica used in place of the titanium dioxide filler for saturating grade paper may vary from about 5 to about 40 weight percent, based on the titanium dioxide. More typically, the amount of silica used will vary from about 10 to about 25 weight percent of the titanium dioxide filler. Only that amount of amorphous precipitated silica is used as a replacement/extender for titanium dioxide which will result in opacity and brightness values for the paper (and decorative laminate) substantially equivalent to that obtained by the use of titanium dioxide alone. Moreover, the laminate should not yellow when consolidated under heat and pressure. Yellowing may be assessed by testing the laminate in a Fadeometer.

The titanium dioxide used as filler in saturating grade paper may be of the anatase or rutile crystalline form. Rutile titanium dioxide is preferred for resin impregnated saturating grade papers.

The core sheet stock used for saturating grade paper may be prepared using conventional papermaking procedures and pulp fibers obtained from softwood, hardwood or mixtures thereof. The pulp may have been prepared utilizing acid (sulfite), alkaline (soda or kraft), neutral and mechanical pulping processes. The pulp may be bleached or unbleached utilizing chlorine, hypochlorite, hydrogen peroxide, or hydrosulfite bleaching procedures. Typically, saturating grade paper is prepared from bleached kraft paper of about 30 to 130, e.g., 40 to 120, pound/ream weight (3000 ft$^2$). the filler for the paper, i.e., titanium dioxide, and the replacement/extender silica described herein, may be added at any point in the wet end of the papermaking system, e.g., at the head box or beating or refining operations.

In preparing decorative laminates using saturating grade paper, the core stock sheet is impregnated with synthetic laminating resin compositions which are typically phenol-formaldehyde resins, although other resins and combinations of resins may be used. For example, U.S. Pat. Nos. 3,220,916, 3,218,225 and 3,589,974 describe the use of conventional phenolic resins to impregnate kraft core sheets in the production of high pressure decorative laminates. U.S. Pat. Nos. 3,938,907 and 3,975,572 disclose the use of a mixture of melamine-formaldehyde and acrylic resins, and U.S. Pat. No. 4,473,613 describes a mixture of a thermoset blend of a phenol-formaldehyde resin, a cross-linked acrylic resin and an optimal melamine-formaldehyde resin.

The thermoset phenol-formaldehyde laminating resin used to impregnate the core sheet is prepared by reacting phenol and formaldehyde in a mole ratio of from about 1:1 to about 1:2.5 respectively. These resins are liquid, water-soluble resins. The melamine-formaldehyde resin is a water-soluble resin having a mole ratio of melamine to formaldehyde of from about 1:1 to about 1:3 respectively and is prepared in accordance with procedures well known in the art. Other laminating resins that may be used include amine, acrylic, epoxy, polyester, silicone and diallyl phthalate resins which may be prepared by art-recognized procedures. For example, acrylic resins are produced in accordance with known acrylic copolymerization procedures, i.e., solution polymerization, bulk polymerization, emulsion polymerization, etc., utilizing any suitable catalyst such as free-radical generating material. The acrylic polymers are well known in the art, e.g., Rhoplex ® HA-12 and TR-934 resins, which are sold by the Rohm and Haas Company. These products are aqueous emulsions of an acrylic resin, e.g., a copolymer of ethyl acrylate and methyl methacrylate.

The synthetic laminating resin compositions may be impregnated into the core sheet, e.g., a kraft sheet, utilizing a dip and squeeze treater or other known impregnating apparatuses, such as dip and spray, reverse roll, etc., from an aqueous solution of the resin. The resin is impregnated into the sheet in amounts ranging from about 15 to about 55 weight percent, preferably from about 20 to about 40 weight percent based on the weight of the paper. Various additives may be added to the aqueous resin blend. Additives such as urea, release agents, defoamers, catalysts, wet strength agents and cross-linking agents fall within the category of useful additives.

Decorative laminates are typically comprised of an assembly of three essential layers; a core layer, a print layer and a surface layer. The core layer comprises a bottom or supporting layer onto which the other layers are bonded. In conventional high-pressure laminate manufacture, the core layer consists of a plurality of cellulosic sheets, e.g., resin impregnated kraft paper. The number of sheets used in the core layer may vary from about 3 to about 9, e.g., 5 to 8 sheets. Superimposed above the core layer is the print layer, which generally is an alpha cellulose pigmented paper containing a print, pattern or design that has been impregnated with a melamine-formaldehyde resin. Typically, the printing is performed prior to impregnation by a high speed rotogravure. The surface layer or overlay sheet, as it is commonly called, is typically a high quality alpha cellulose paper impregnated with a melamine-formaldehyde resin. This layer protects the print sheet from external abuse, such a abrasion wear and tear, harsh chemicals, burns, spills and the like.

In preparing the decorative laminate, the core layer, print layer and surface layer are stacked in a superimposed relationship, the resulting bundle of sheets placed between polished steel plates and subjected to pressure and temperature for a time sufficiently long to cure the laminating resins impregnating the respective layers. Temperatures of between about 120° C. and 250° C. are typically used. Decorative laminates may be prepared using both high and low pressure. High pressure decorative laminates are typically formed using between about 800 and about 1600 pounds per square inch (psi) pressure (5.5–11 MPa), e.g., 1000 psi (6.9 MPa). Flexible decorative laminates are prepared using low pressures, e.g., pressures below 5.5 MPa, e.g., 175–225 psi (1.2–1.6 MPa).

Decorative laminates, particularly high pressure laminates, find utility in the manufacture of furniture, kitchen counter tops, table tops, store fixtures, wall paneling, partitions, doors, bathroom and kitchen work surfaces and wallpaper.

The present invention is more particularly described in the following examples which are intended as illustrative only, since numerous modifications and variations therein will be apparent to those skilled in the art.

EXAMPLE 1

2964.5 grams of a 50/50 hardwood/softwood bleached kraft pulp beaten to a Canadian Standard Freeness (CSF) of 475+/−25 milliliters (ml) were mixed with a slurry of 26.7 grams of rutile titanium dioxide (DuPont R-794) and 33.7 grams of deionized water. 1.05 grams of paper makers alum was added to the mixture (equivalent to about 10 lbs. dry alum per ton). The resultant blend was diluted to about a 0.03% consistency with deionized water and a small amount of sodium aluminate added to the resultant slurry to adjust the pH of the slurry to 6.3. A series of 8 inch×8 inch (20.3 centimeters×20.3 centimeters) handsheets having a basis weight of 41 pounds/3000 ft$^2$ were prepared from the slurry on a Nobel and Wood machine. The handsheets were passed through a felt press and then a drum dryer to reduce the moisture of the sheets to about 5 weight percent. The sheets were then placed in a 50% constant relative humidity room having a temperature of 72° F. (22° C.). The brightness, opacity and percent ash of a representative sheet were measured. Brightness and opacity were measured using an Elrepho ® meter using ISO STANDARD Nos. 2470 and 2471 procedures respectively.

A handsheet was cut into 2 inch (5.1 centimeters)×8 inch (20.3 centimeters) strips and each strip submerged for 45 seconds in a 50% aqueous solution of a melamine-formaldehyde resin (Cymel# 412) available from American Cyanamid Company. Each strip was removed from the resin solution and drawn over a stainless steel bar to remove excess resin. The strips were placed in a 105°–110° C. oven for 5 minutes to polymerize the resin and remove moisture. The resin-saturated strips were then placed in the constant relative humidity room. The opacity and brightness of the resin-saturated strips were measured using the Elrepho ® meter.

Results obtained are reported in Table 1.

EXAMPLE 2

The procedure of Example 1 was followed except that 2967.9 grams of pulp, 24.01 grams of titanium dioxide (TiO$_2$) and 2.7 grams of amorphous precipitated silica (SiO$_2$) were used. The amount of silica used represented about a 10% replacement of the titanium dioxide. The silica had a BET surface area of about 71 m$^2$/g, a pH of 6.8 (5% slurry in water), a median agglomerate particle size of 4.3 microns and contained about 0.48 percent sodium sulfate (X-ray determination). Results are reported in Table I.

EXAMPLE 3

The procedure of Example 1 was followed except that 2954.7 grams of pulp, 21.34 grams of titanium dioxide and 5.4 grams of the silica of Example 2 were used. This amount of silica represented about a 20% replacement of the titanium dioxide. Results are reported in Table I.

TABLE I

| EXAMPLE | % TiO$_2$ | % SiO$_2$ | ORIGINAL SHEET BRIGHT-NESS | OPACITY | % ASH | SATURATED SHEET BRIGHT-NESS | OPACITY |
|---|---|---|---|---|---|---|---|
| 1 | 100 | — | 91.0 | 96.0 | 23.5 | 83.8 | 87.6 |
| 2 | 90 | 10 | 91.3 | 95.6 | 23.4 | 84.3 | 87.7 |
| 3 | 80 | 20 | 91.2 | 96.1 | 23.0 | 83.9 | 87.7 |

The data of Table I show that as much as 20% of the titanium dioxide can be replaced with the described essentially neutral silica without loss of the paper properties brightness and opacity. Ash values for the various sheets are also constant around 23.0–23.5 percent.

EXAMPLE 4

The procedure of Example 1 was followed using 2948.8 grams of pulp and 26.8 grams of titanium dioxide. In addition 1.34 grams of an aqueous solution of Cymel ® 412 resin was added to the wet end of the paper making machine (0.5% on a furnish basis) as a wet strength additive. Data is reported in Table II.

EXAMPLE 5

The procedure of Example 4 was followed using 2948.8 grams of pulp, 24.2 grams of titanium dioxide, 2.7 grams of the silica of Example 2 and 1.34 grams of an aqueous solution of Cymel ® 412 resin. This amount of silica represented about a 10% replacement of the titanium dioxide. Data is reported in Table II.

EXAMPLE 6

The procedure of Example 4 was followed using 2948.8 grams of pulp, 21.4 grams of titanium dioxide and 5.4 grams of the silica of Example 2 and 1.34 grams of an aqueous solution of Cymel# 412 resin. This amount of silica represented about a 20% replacement of the titanium dioxide. Data is reported in Table II.

TABLE II

| EXAMPLE | % TiO$_2$ | % SiO$_2$ | ORIGINAL SHEET BRIGHT-NESS | OPACITY | % ASH | SATURATED SHEET BRIGHT-NESS | OPACITY |
|---|---|---|---|---|---|---|---|
| 4 | 100 | — | 91.0 | 96.1 | 25.5 | 84.1 | 87.8 |
| 5 | 90 | 10 | 90.8 | 95.9 | 23.5 | 83.3 | 87.1 |
| 6 | 80 | 20 | 90.2 | 96.0 | 22.4 | 83.2 | 87.1 |

The data of Table II shows that as much as 20% of the titanium dioxide can be replaced with the described essentially neutral silica in saturated sheets containing 0.5 weight percent wet strength additive.

EXAMPLE 7

3207.2 grams of a 70/30 hardwood/softwood bleached kraft pulp slurry having a consistency of 2.40% and beaten to a Canadian Standard Freeness (CSF) of 481±25 milliliters (ml) were mixed with a slurry of 32.99 grams rutile titanium dioxide (DuPont R-794) and 100 grams deionized water. 1.176 grams of paper makers alum was added to the mixture under agitation. The resultant blend was diluted to about 0.03% consistency with deionized water and enough sodium aluminate was added to adjust the pH to 7.06. A series of 8 inch×8 inch (20.3 centimeters×20.3 centimeters) handsheets having a basis weight of 45 pounds/3000 ft$^2$ were prepared from the slurry on a Noble and Wood machine. The handsheets were passed through a felt press and then through a drum dryer to reduce the moisture of the sheets to about 5 weight percent. The sheets were placed in a 50% constant relative humidity room having a temperature of 72° F. (22° C.). The brightness, opacity and percent ash of a representative sheet were measured. Brightness and opacity were measured using an Elrepho ® meter using ISO STANDARD NO. 2470 and No. 2471 procedures, respectively.

A handsheet was cut into 2 inch (5.1 centimeters)×8 inch (20.3 centimeters) strips and each sheet submerged for 45 seconds in a 50% aqueous solution of a melamine-formaldehyde resin (Cymel ® 412) available from American Cyanamid Company. Each strip was removed from the resin solution and drawn over a stainless steel bar to remove excess resin. The strips were placed in a 105°–110° 1 C. oven for 5 minutes to polymerize the resin and remove moisture. The resin-saturated strips were then placed in a constant relative humidity room. The opacity and brightness of the resin saturated sheets were measured using the Elrepho ® meter.

Results obtained are reported in Table III.

EXAMPLE 8

The procedure of Example 7 was followed except that 3207.2 grams of pulp slurry, 26.39 grams of titanium dioxide (TiO$_2$) and 6.60 grams of amorphous precipitated silica (SiO$_2$) were used. This amount of silica represents about a 20% replacement of the titanium dioxide. The silica had a BET surface area of about 56 m$^2$/g, a pH of 8.2 (5% slurry in water) a median agglomerate particle size of about 8.7 microns and contained about 0.90% sodium sulfate (X-ray determination). Results are reported in Table III.

TABLE III

| EXAMPLE | TiO₂ | % SiO₂ | ORIGINAL SHEET BRIGHTNESS | OPACITY | % ASH | SATURATED SHEET BRIGHTNESS | OPACITY |
| --- | --- | --- | --- | --- | --- | --- | --- |
| 7 | 100 | — | 90.4 | 96.3 | 27 | 82.3 | 88.5 |
| 8 | 80 | 20 | 90.9 | 96.6 | 26 | 83.0 | 87.8 |

The data of Table III show that as much as 20% of the titanium dioxide can be replaced with the described amorphous silica without loss of paper properties of brightness and opacity. Ash values for the various sheets appeared to decrease slightly for the 20% silica samples, but this did not effect the optical properties.

EXAMPLE 9

4155.1 grams of a 70/30 hardwood/softwood bleached kraft pulp slurry having a consistncy of 2.47% and beaten to a Canadian Standard Freeness (CSF) of 425±25 millilitrs (ml) was mixed with a slurry of 51.32 grams of rutile titanium dioxide (DuPont R-794) in 100 grams deionized water. Liquid paper makers alum (8.3% $Al_2O_3$) was added to the mixture under agitation until the pH was 4.4. The resultant blend was diluted to about 0.03% consistency with deionized water and enough sodium aluminate was added to adjust the pH to 7.10. A series of 8 inch × 8 inch (20.3 centimeters × 20.3 centimeters) handsheets having a basis weight of 64 pounds/3300 ft² were prepared from the slurry on a Noble and Wood machine. The handsheets were passed through a felt press and then through a drum dryer to reduce the moisture of the sheets to about 5 weight percent. The sheets were placed in a 50% constant relative humidity room having a temperature of 72° F. (22° C.). The brightness, opacity and percent ash of a representative sheet were measured. Brightness and opacity were measured using an Elrepho ® meter using ISO STANDARD No. 2470 and No. 2471 procedures, respectively.

A handsheet was cut into 2 inch (5.1 centimeters) × 8 inch (20.3 centimeters) strips and each sheet submerged for 45 seconds in a 50% aqueous solution of a melamine-formaldehyde resin (Cymel ® 412) available from American Cyanamid. Each strip was removed from the resin solution and drawn over a stainless steel bar to remove excess rein. The strips were placed in a 105°–110° C. oven for 5 minutes to polymerize the resin and remove moisture. The resin-saturated strips were then placed in a constant relative humidty room. The opacity and brightness was measured using the Elrepho ® meter.

The results obtained are reported in Table IV.

EXAMPLE 10

The procedure of Example 9 was followed except that 4155.1 grams of pulp slurry, 41.06 grams of titanium dioxide (TiO₂) and 10.26 grams of the amorphous precipitated silica (SiO₂) used in Example 8 were used. This amount of silica represents about 20% replacement of the titanium dioxide. Results are reported in Table IV.

TABLE IV

| EXAMPLE | TiO₂ | % SiO₂ | ORIGINAL SHEET BRIGHTNESS | OPACITY | % ASH | SATURATED SHEET BRIGHTNESS | OPACITY |
| --- | --- | --- | --- | --- | --- | --- | --- |
| 9 | 100 | — | 91.4 | 98.1 | 30 | 84.4 | 93.0 |
| 10 | 80 | 20 | 91.7 | 98.2 | 30 | 84.2 | 92.8 |

The data of Table IV show that as much as 20% of the titanium dioxide can be replaced with the described slightly alkaline silica without loss of paper properties of brightness and opacity. Ash values were the same for both experiments.

EXAMPLE 11

3812.0 grams of a 70/30 hardwood/softwood bleached kraft pulp beaten to a Canadian Standard Freeness (CSF) of 450±25 milliliters (ml) was mixed with a slurry of 47.65 grams of rutile titanium dioxide (DuPont R-794) and 100 grams of deionized water. 1.28 grams of paper makers alum was added to the mixture. The resultant blend was diluted to about a 0.03% consistency with deionized water and a small amount of sodium aluminate added to the resultant slurry to adjust the pH of the slurry to 7.0. A series of 8 inch × 8 inch (20.3 centimeters × 20.3 centimeters) handsheets having a basis weight of 60 pounds/3000 ft² were prepared from the slurry on a Nobel and Wood machine. The handsheets were passed through a felt press and then a drum dryer to reduce the moisture of the sheets to about 5 weight percent. The sheets were then placed in a 50% constant relative humidity room having a temperature of 72° F. (22° C.). The brightness, opacity and percent ash of a representative sheet were measured. Brightness and opacity were measured using an Elrepho ® meter using ISO STANDARD No. 2470 and No. 2471 procedures respectively.

A handsheet was cut into 2 inch (5.1 centimeters) × 8 inch (20.3 centimeters) strips and each strip submerged for 45 seconds in a 50% aqueous solution of a melamine-formaldehyde resin (Cymel ® 412) available from American Cyanamid Company. Each strip was removed from the resin solution and drawn over a stainless steel bar to remove excess resin. The strips were placed in a 105°–110° C. oven for 5 minutes to polymerize the resin and remove moisture. The resin-saturated strips were then placed in the constant relative humidity room. The opacity and brightness of the resin-saturated strip was measured using the Elrepho ® meter.

Results obtained are reported in Table V.

EXAMPLE 12

The procedure of Example 11 was followed except that 3812.0 grams of pulp, 42.88 grams of titanium dioxide (TiO₂) and 4.76 grams of amorphous precipitated silica (SiO₂) were used. The amount of silica used represented about a 10% replacement of titanium dioxide. The silica had a BET surface area of about 60 m²/g, a pH of 8.1 (5% slurry in water), a median agglomerate particle size of 10.0 microns and contained about 0.78 percent sodium sulfate (X-ray determination). Results are reported in Table V.

EXAMPLE 13

The procedure of Example 11 was followed except that 3812.0 grams of pulp, 38.12 grams of titanium dioxide and 9.53 grams of the silica of Example 12 were used. This amount of silica represented about a 20% replacement of the titanium dioxide. Results are reported in Table V.

TABLE V

| | | | ORIGINAL SHEET | | | SATURATED SHEET | |
|---|---|---|---|---|---|---|---|
| EXAMPLE | % $TiO_2$ | % $SiO_2$ | BRIGHT-NESS | OPACITY | % ASH | BRIGHT-NESS | OPACITY |
| 11 | 100 | 13 | 91.1 | 98.7 | 32.0 | 83.2 | 92.4 |
| 12 | 90 | 10 | 91.5 | 98.6 | 30.5 | 83.4 | 92.0 |
| 13 | 80 | 20 | 91.2 | 98.7 | 28.5 | 82.8 | 91.8 |

The data of Table V show that as much as 20% of the titanium dioxide can be replaced with the described slightly alkaline silica without loss of the paper properties brightness and opacity. Ash values for the sheets varied between 28.5 and 32.0.

Although the present process has been described with reference to specific details of certain embodiments thereof, it is not intended that such details should be regarded as limitations upon the scope of the invention, except as and to the extent that they are included in the accompanying claims.

I claim:

1. A resin saturable paper sheet containing titanium dioxide as the principal filler and from about 5 to about 40 weight percent, basis the titanium dioxide, of amorphous precipitated silica having a BET surface area of between about 25 and 200 square meters per gram, a pH of between about 6 and 9.5 and a median agglomerate particle size of less than about 30 micrometers, said silica containing less than about 1 weight percent of calcium (calculated as calcium oxide).

2. The paper sheet of claim 1 wherein the amorphous precipitated silica has a BET surface area of between about 40 and about 120 square meters per gram, a pH between about 6.5 and 8.5 and a median agglomerate particle size of between about 3 and 10 micrometers.

3. The paper sheet of claim 2 wherein the amount of silica is from about 10 to about 25 weight percent, basis the titanium dioxide.

4. The paper sheet of claim 3 wherein the amorphous precipitated silica has a BET surface area of between about 50 and 100 square meters per gram, a median agglomerate particle size of between 3 and 5 micrometers, and a pH between about 6.5 and 7.5.

5. The paper sheet of claim 4 wherein the BET surface area of the silica is between about 60 and 90 square meters per gram.

6. The paper sheet of claim 4 wherein the titanium dioxide is of the rutile crystalline form.

7. The paper sheet of claim 6 where the paper is prepared from bleached kraft paper.

8. The paper sheet of claim 3 wherein the amorphous precipitated silica has a BET surface area of between 50 and 100 square meters per gram, a median agglomerate particle size of between 7 and 10 micrometers, and a pH of between about 8 and about 8.5.

9. The paper sheet of claim 8 wherein the BET surface area of the silica is between about 50 and about 80 square meters per gram.

10. The paper sheet of claim 8 wherein the titanium dioxide is of the rutile crystalline form.

11. The paper sheet of claim 10 wherein the paper is prepared from bleached kraft paper.

12. A resin saturable paper sheet of bleached kraft paper, said paper sheet containing rutile titanium dioxide as the principal filler and from about 10 to about 25 weight percent, basis the titantium dioxide, of amorphous precipitated silica having a BET surface area of between about 50 and 90 square meters per gram, a pH in the range of between about 6.5 and 8.5 and a median agglomerate particle size of between 3 and 10 micrometers, said silica containing less than about 1 weight percent of calcium (calculated as calcium oxide).

13. A paper sheet of claim 12 which has been impregnated with a synthetic resinous composition.

14. A paper sheet of claim 13 wherein the synthetic resinous composition is selected from the group consisting of phenol-formaldehyde resins, melamine-formaldehyde resins and polyester resins.

15. In a decorative laminate comprising a core of a least one sheet of titanium dioxide-filled saturable paper sheet that has been impregnated with a synthetic laminating resin composition, the improvement wherein the saturable paper sheet contains from about 5 to about 40 weight percent, basis the titanium dioxide, of amorphous precipitated silica having a BET surface area of between about 25 and 200 square meters per gram, a pH of between about 6 and 9.5, and a median agglomerate particle size of less than about 30 micrometers, said silica containing less than about 1 weight percent of calcium (calculated as calcium oxide).

16. The decorative laminate of claim 15 wherein the saturable paper sheet contains from about 10 to about 25 weight percent, basis the titanium dioxide, of the amorphous precipitated silica and the amorphous precipitated silica has a BET surface area of between about 50 and about 100 square meters per gram, a pH of between 6.5 and 8.5 and a median agglomerate particle size between 3 and 10 micrometers.

17. The decorative laminate of claim 16 wherein the saturable paper sheet is prepared from bleached kraft paper, the silica has a median agglomerate particle size between about 3 and 5 micrometers and a pH between 6.5 and 7.5, and the titanium dioxide is of the rutile crystalline form.

18. The decorative laminate of claim 17 wherein the silica has a BET surface area of from about 60 to 90 square meters per gram.

19. The decorative laminate of claim 18, wherein the saturable paper is impregnated with a synthetic laminating resin composition selected from the group consisting of phenol-formaldehyde resins, melamine-formaldehyde resins and polyester resins.

20. The decorative laminate of claim 16 wherein the saturable paper sheet is prepared from bleached kraft paper, the silica has a median agglomerate particle size between about 7 and 10 micrometers and a pH of between about 8 and about 8.5 micrometers, and the titanium dioxide is of the rutile crystalline form.

21. The decorative laminate of claim 20 wherein the silica has a BET surface area of from about 50 to about 80 square meters per gram.

22. The decorative laminate of claim 21 wherein the saturable paper sheet is impregnated with a synthetic laminating resin composition selected from the group consisting of phenol-formaldehyde resins, melamine-formaldehyde resins and polyester resins.

* * * * *